(12) United States Patent
Sugimoto et al.

(10) Patent No.: US 7,328,044 B2
(45) Date of Patent: Feb. 5, 2008

(54) MOBILE DEVICE REGISTRATION SYSTEM

(75) Inventors: Takashi Sugimoto, Tokyo (JP);
Toshiaki Hata, Tokyo (JP)

(73) Assignee: Mitsubishi Denki Kabushiki Kaisha,
Tokyo (JP)

( * ) Notice: Subject to any disclaimer, the term of this patent is extended or adjusted under 35 U.S.C. 154(b) by 480 days.

(21) Appl. No.: 11/095,570

(22) Filed: Apr. 1, 2005

(65) Prior Publication Data
US 2006/0111046 A1 May 25, 2006

(30) Foreign Application Priority Data
Nov. 24, 2004 (JP) ............................. 2004-338884

(51) Int. Cl.
*H04M 1/00* (2006.01)
(52) U.S. Cl. ................ 455/558; 455/569.2; 455/575.9; 701/117; 340/995.1
(58) Field of Classification Search ................ 455/558, 455/569.2, 575.9, 99, 297; 701/117, 1; 340/995.1
See application file for complete search history.

(56) References Cited

U.S. PATENT DOCUMENTS

| | | | | |
|---|---|---|---|---|
| 5,459,304 | A * | 10/1995 | Eisenmann | 235/380 |
| 6,078,817 | A * | 6/2000 | Rahman | 455/452.1 |
| 6,693,890 | B1 * | 2/2004 | Yick et al. | 370/342 |
| 7,140,036 | B2 * | 11/2006 | Bhagavatula et al. | 726/2 |
| 2004/0002354 | A1 * | 1/2004 | Nagano | 455/550.1 |
| 2004/0122561 | A1 * | 6/2004 | Fujinuma et al. | 701/1 |
| 2004/0176969 | A1 * | 9/2004 | Fujinuma | 705/1 |
| 2005/0137795 | A1 * | 6/2005 | Sakamoto et al. | 701/211 |
| 2007/0067827 | A1 * | 3/2007 | Bhagavatula et al. | 726/2 |
| 2007/0155363 | A1 * | 7/2007 | Rager et al. | 455/410 |

FOREIGN PATENT DOCUMENTS

| | | |
|---|---|---|
| DE | 100 04 615 C2 | 1/2002 |
| DE | 101 12 573 C2 | 2/2002 |
| JP | 9-279917 | 10/1997 |
| JP | 3479953 B2 | 10/2003 |
| JP | 2004-107959 | 4/2004 |

* cited by examiner

*Primary Examiner*—Matthew Anderson
*Assistant Examiner*—Minh Dao
(74) *Attorney, Agent, or Firm*—Sughrue Mion, PLLC

(57) ABSTRACT

To provide a mobile device registration system, with which it is impossible to register from a third party's mobile device which is already registered with respect to one vehicle, a mobile device ID with respect to another vehicle to improve security. The system of the present invention includes: a smart unit mounted in a vehicle that has a unique smart ID corresponding to the vehicle and allows registration a mobile device ID; and a mobile device having a unique mobile device ID and allowing registration of the smart ID. In the system, when the smart unit registers the mobile device ID of one mobile device, the smart unit registers its own smart ID into the one mobile device, and unlocking or locking of the vehicle is performed only when the smart unit detects the mobile device having the mobile device ID that is registered in the smart unit.

6 Claims, 5 Drawing Sheets

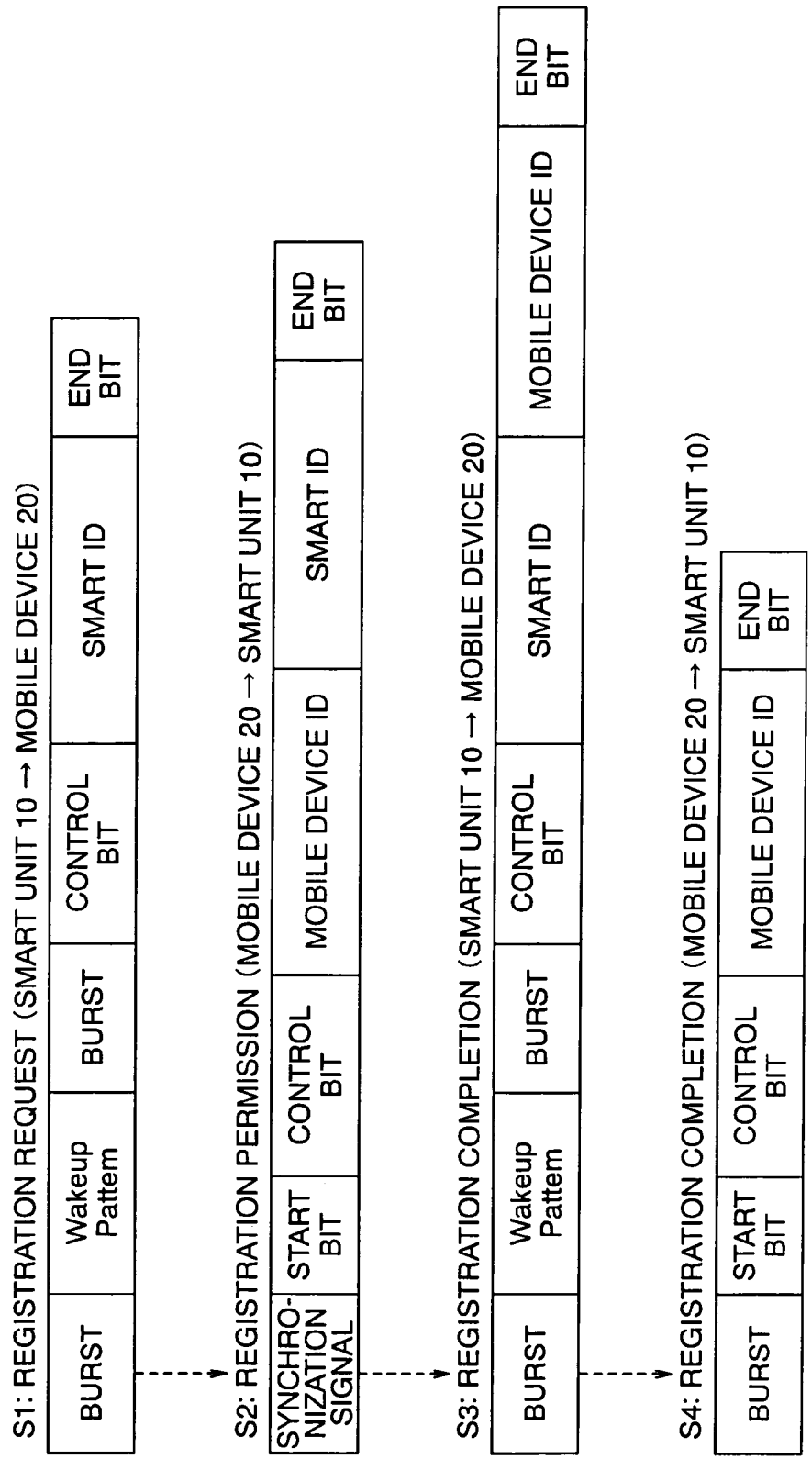

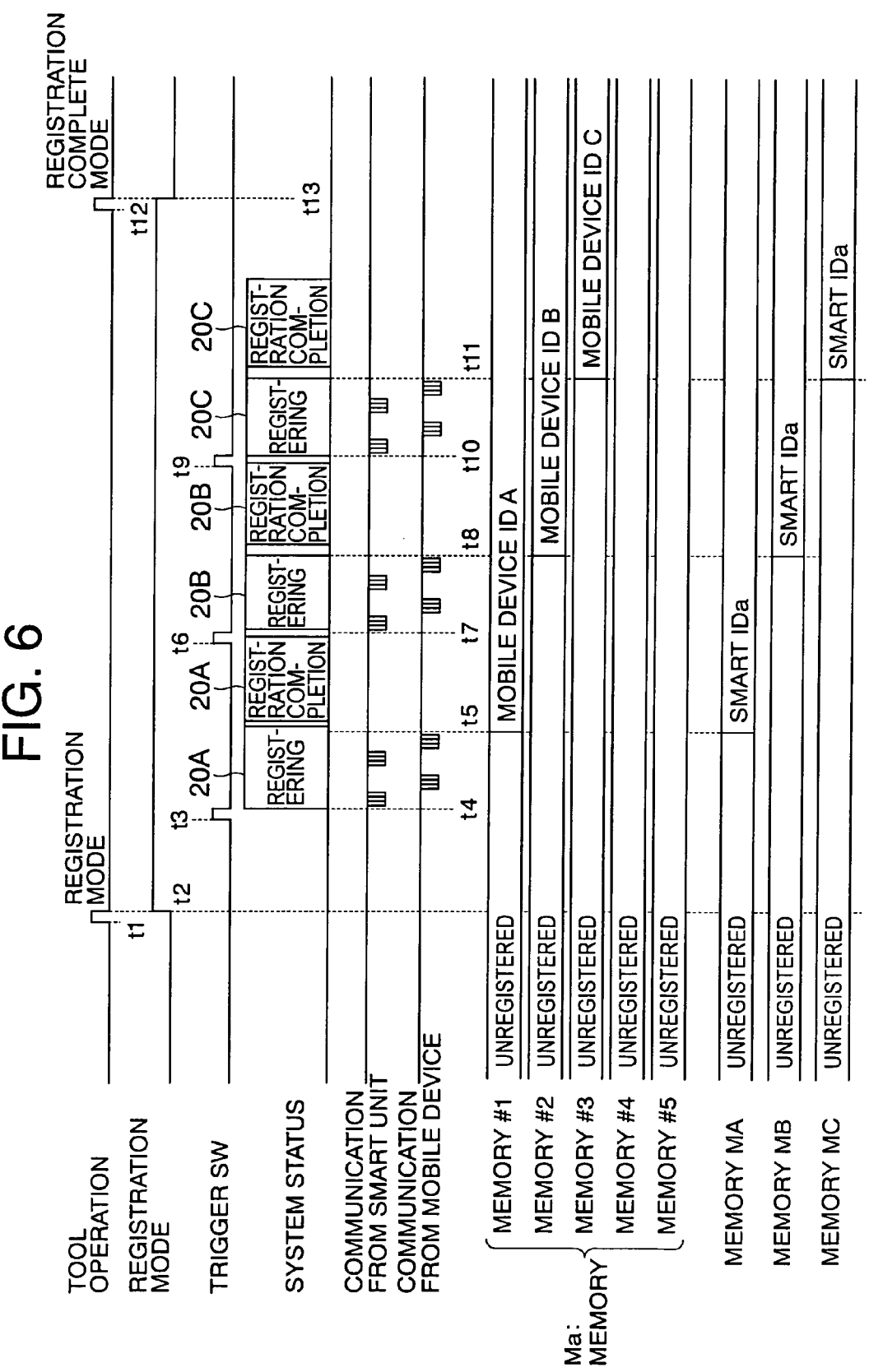

MOBILE DEVICE REGISTRATION SYSTEM

BACKGROUND OF THE INVENTION

1. Field of the Invention

The present invention relates to a mobile device registration system to be used for preventing theft of an automobile, motorcycle or other such vehicle, which is capable of performing unlocking and locking without using a common mechanical key. In particular, the present invention relates to a mobile device registration system in which communication is performed between a mobile device held by a user and a smart unit furnished to the vehicle, and the smart unit can unlock or lock the vehicle only when the mobile device and the smart unit match with each other.

2. Description of the Related Art

Generally, when registering a mobile device that can be used with a particular vehicle, a mobile device ID is registered into a smart unit (for example, see JP 3479953 B). As a result, unlocking and locking operations can be accepted only when the smart unit detects that the user is carrying a mobile device that has a registered ID which has been registered.

In a conventional mobile device registration system when registering the mobile device ID into the smart unit, since the smart unit cannot obtain information showing whether the mobile device to be registered is registered anew or is already registered in another smart unit, the mobile device can be registered anew into the smart unit even though the mobile device is already registered in the other smart unit.

Therefore, a third party who thoroughly knows how to register the mobile device ID into the smart unit can register his own ID of the mobile device into the other smart unit, whereby he can steel the vehicle where the another smart unit is mounted. Thus there was a problem in that security (theft prevention) could not be guaranteed.

SUMMARY OF THE INVENTION

The present invention has been made to solve the above-mentioned problems, and it is therefore an object of the present invention to obtain a mobile device registration system in which a third party carrying a mobile device which is already registered for a particular vehicle cannot make registration targeted for another vehicle even if he thoroughly knows a method of registering a mobile device ID.

A mobile device registration system according to the present invention includes: a smart unit mounted in a vehicle that has a unique smart ID corresponding to the vehicle and allows registration of a mobile device ID; and a mobile device having a unique mobile device ID and allowing registration of the smart ID. In the mobile device registration system, when the smart unit registers the mobile device ID of one mobile device, the smart unit registers its own smart ID into the one mobile device, and unlocking or locking of the vehicle is performed only when the smart unit detects the mobile device having the mobile device ID that is registered in the smart unit. Further, in the mobile device registration system, when the smart unit registers the mobile device ID of the one mobile device, in a case where no registered smart ID exists in the one mobile device, the smart unit registers the mobile device ID of the one mobile device, and in a case where a registered smart ID exists in the one mobile device, the smart unit registers the mobile device ID of the one mobile device only when the registered smart ID matches its own smart ID.

In accordance with the present invention, from a third party's mobile device which is already registered with respect to one vehicle, it is impossible to register a mobile device ID with respect to another vehicle, whereby security is improved.

BRIEF DESCRIPTION OF THE DRAWINGS

In the accompanying drawings:

FIG. 5 is an explanatory diagram showing data structures of signals that are sent and received, as correspond to each processing in FIG. 4; and FIG. 6 is a timing chart showing a mobile device registration procedure according to Embodiment 1 of the present invention.

DETAILED DESCRIPTION OF THE PREFERRED EMBODIMENTS

Embodiment 1

Hereinafter, the accompanying drawings will be referenced to give detailed explanations regarding Embodiment 1 of the present invention.

Figure 1:
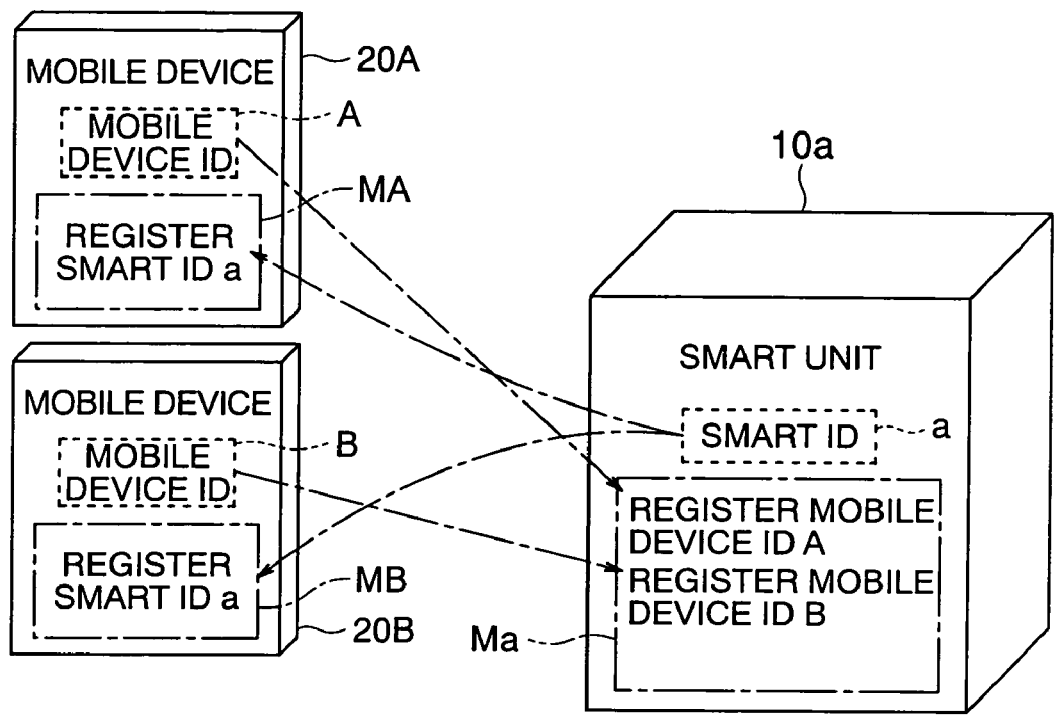
FIG. 1 is a block diagram showing processing in a mobile device registration system according to Embodiment 1 of the present invention.

FIG. 1 is a block diagram showing processing of a mobile device registration system in accordance with Embodiment 1 of the present invention. FIG. 1 shows a case where two mobile devices 20A, 20B are properly registered in a single smart unit 10a in association with a vehicle.

In FIG. 1, the mobile device registration system is constructed with the smart unit 10a mounted in a vehicle for unlocking and locking the vehicle, and an arbitrary number of mobile devices 20A, 20B carried by users.

Registration of the mobile devices 20A, 20B into the smart unit 10a is performed by use of a registration tool and trigger switch, which are carried by the manufacturer and dealer, and which are described below.

In this instance, the two mobile devices 20A, 20B that are registered in the smart unit 10a as proper mobile devices are carried by the two drivers respectively, thus enabling them to drive the vehicle in which the smart unit 10a is mounted.

The smart unit 10a is given a unique smart IDa that has been set in advance in association with the vehicle in which the smart unit 10a itself is mounted, and has an erasable memory Ma for registering an arbitrary number of mobile device IDs.

Note that, although omitted from the diagrams here, the registration tool and trigger switch carried by the manufacturer and dealer are used to register the mobile devices 20A, 20B. Furthermore, in order to guarantee security, registration operations are not normally performed by the users.

The mobile devices 20A, 20B have mobile device IDs A, B which are each respectively unique, and memories MA, MB (which are normally non-erasable to guarantee security) for registering the smart IDa of the smart unit 10a in which they are each registered.

The smart unit 10a and the mobile devices 20A, 20B are constructed so as to be capable of mutual communications, as indicated by dotted-line arrows.

When the smart unit 10a registers into the memory Ma the mobile device IDsA, B of the mobile devices 20A, 20B which are to be registered, the smart unit 10a registers its own smart IDa into the memories MA, MB of the mobile devices 20A, 20B.

As shown in FIG. 1, after the processing for registering the mobile devices 20A, 20B into the smart unit 10a, the mobile device IDs A, B of the mobile devices 20A, 20B are registered into the memory Ma of the smart unit 10a, and the smart IDa of the smart unit 10a is registered into each of the memories MA, MB of the mobile devices 20A, 20B.

The vehicle can be thus unlocked and locked only when the smart unit 10a detects the mobile device 20A or 20B having the mobile device ID A or B which was registered into the smart unit 10a.

Furthermore, upon registration of a mobile device ID of a new mobile device, if there is a smart ID which is already registered into the memory of the new mobile device, then the smart unit 10a accepts the registration of the mobile device ID of the new mobile device only in the case where the registered smart ID matches the smart IDa of the smart unit 10a itself.

In other words, when registering the mobile device IDs A, B into the smart unit 10a, in response to a registration request sent from the smart unit 10a, the mobile devices 20A, 20B confirm that the smart ID is not yet registered in the memories MA, MB of each mobile device. If the smart ID is not yet registered, then a registration permission signal is sent to the smart unit 10a.

The smart unit 10a responds to the registration permission signal from the mobile devices 20A, 20B and assumes that the mobile devices 20A, 20B are not registered in another smart unit. The smart unit 10a then registers the mobile device IDs A, B into the i,memory Ma, and sends a registration completion signal.

The mobile devices 20A, 20B respond to the registration completion signal from the smart unit 10a and register the smart IDa into the memories MA, MB, and similarly send a registration completion signal.

Finally, the smart unit 10a confirms that the mobile device IDs A, B included in the registration completion signals from the mobile devices 20A, 20B match the mobile device IDs that are already registered in the memory Ma, and thus the registration processing ends.

Note that, as another example of the processing for accepting registration of the new mobile device ID into the smart unit 10a, there is a method of confirming the smart ID that is registered into the mobile device in advance at the time when the mobile device is shipped out from the manufacturer.

For example, explanation will now be given using one mobile device 20A as an example. When the mobile device 20A is shipped out, there are cases where the smart unit ID of a particular smart unit where the mobile device 20A is supposed to be registered has already been written into the mobile device.

In such a case, the registration of the mobile device ID A into the smart unit 10a is permitted only in the case where the smart ID that is already registered in the memory MA of the mobile device 20A matches the smart IDa of the smart unit 10a itself.

Furthermore, in a case where a mobile device ID that was once registered in a given smart unit is to be deleted and a new mobile device ID is to be registered therein, the smart ID remains written in the pre-deletion mobile device.

Even in this case, the smart unit 10a registers the mobile device ID only in the case where the smart ID that has been registered in the new mobile device matches the smart IDa of the smart unit 10a itself.

Figure 2:
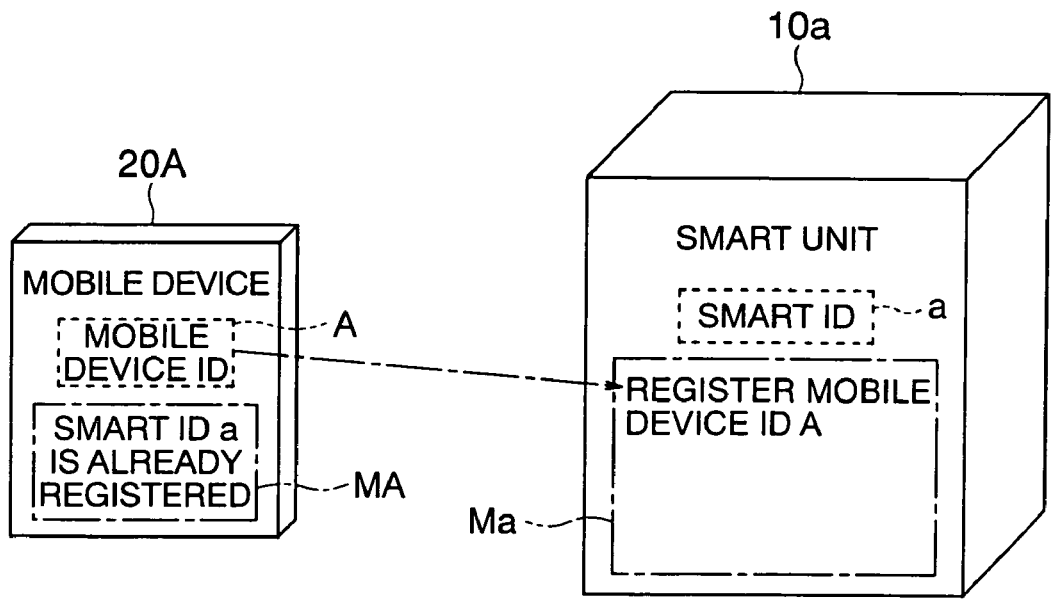
FIG. 2 is a block diagram showing processing when a mobile device whose smart ID is already registered gets registered into a smart unit according to Embodiment 1 of the present invention.

FIG. 2 is a block diagram showing processing in a case where the mobile device 20A having the smart IDa which has been already registered, is registered into the smart unit 10a. Components similar to the above-mentioned ones (see FIG. 1) are indicated by the same reference numerals, and detailed explanations are omitted.

In FIG. 2, the mobile device 20A responds to the registration request from the smart unit 10a and compares the smart IDa already registered in the memory MA against the smart IDa in the smart unit 10a. In the case where they both match each other, the mobile device 20A sends out the registration permission signal (see the dotted-line arrow).

Accordingly, the mobile device ID A of the mobile device 20A is then registered into the memory Ma of the smart unit 10a.

Figure 3:
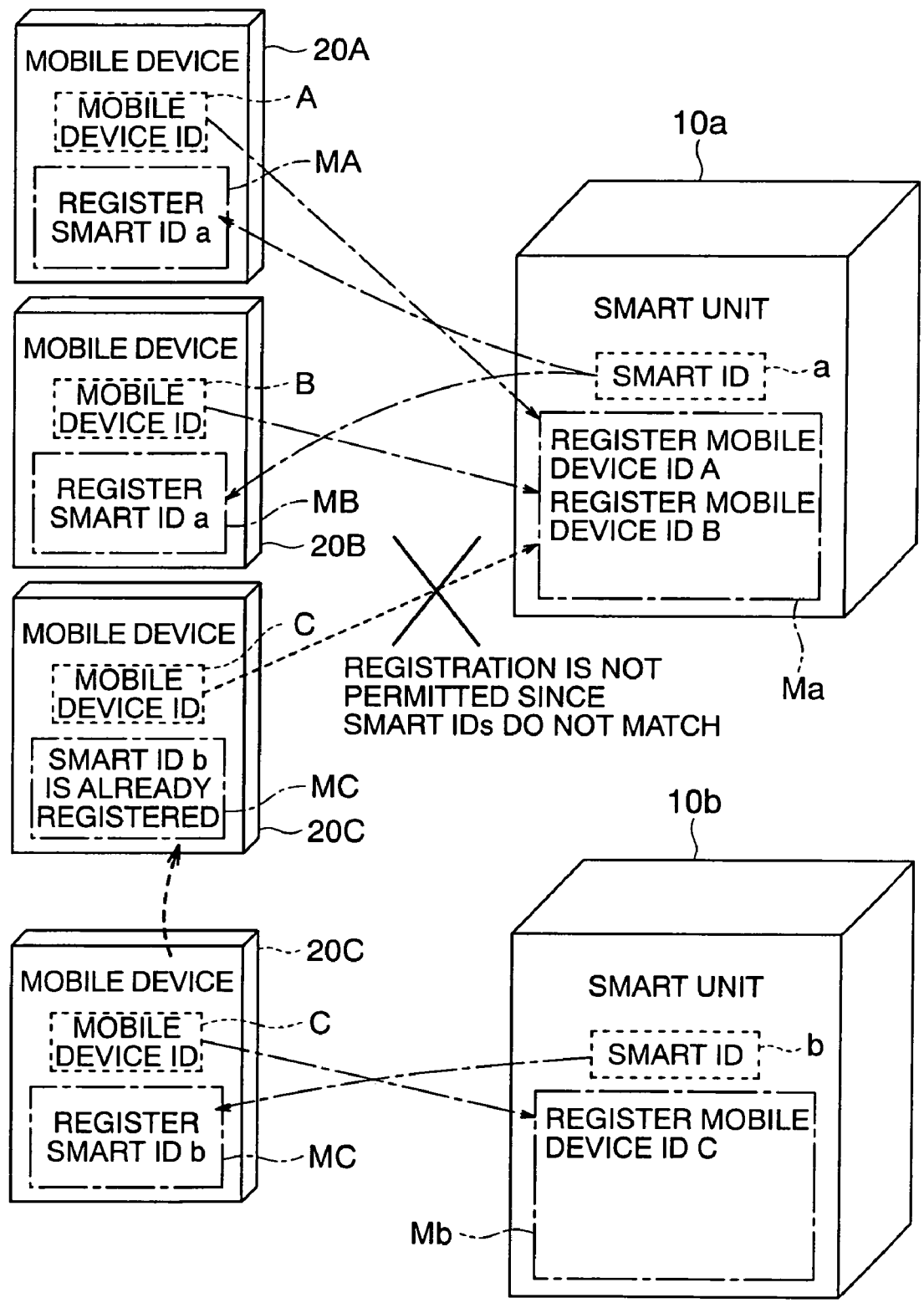
FIG. 3 is a block diagram showing illegitimate registration prevention processing according to Embodiment 1 of the present invention.

FIG. 3 is a block diagram showing illegitimate registration prevention processing in accordance with Embodiment 1 of the present invention, showing a state where a mobile device 20C that is already registered in another smart unit 10b is prohibited from being registered into the smart unit 10a.

In FIG. 3, the mobile devices 20A, 20B, which do not have the smart ID registered in their memories MA, MB in their initial states, are registered into the smart unit 10a as described above.

On the other hand, in a case where one tries to register into the smart unit 10a the mobile device 20C which is already registered into the other smart unit 10b, a smart IDb that is already registered in a memory MC in the mobile device 20C does not match the smart IDa of the smart unit 10a for which the new registration request was made. Therefore, the registration permission signal is not sent to the smart unit 10a (see the mark "X").

In this way, the registration permission signal is prohibited from being sent, even when one tries to register into the smart unit 10a the mobile device ID C of the mobile device 20C that was already registered into the smart unit 10b (not the smart unit 10a). Thus, the mobile device ID C cannot be illegitimately registered into the smart unit 10a.

Figure 4:
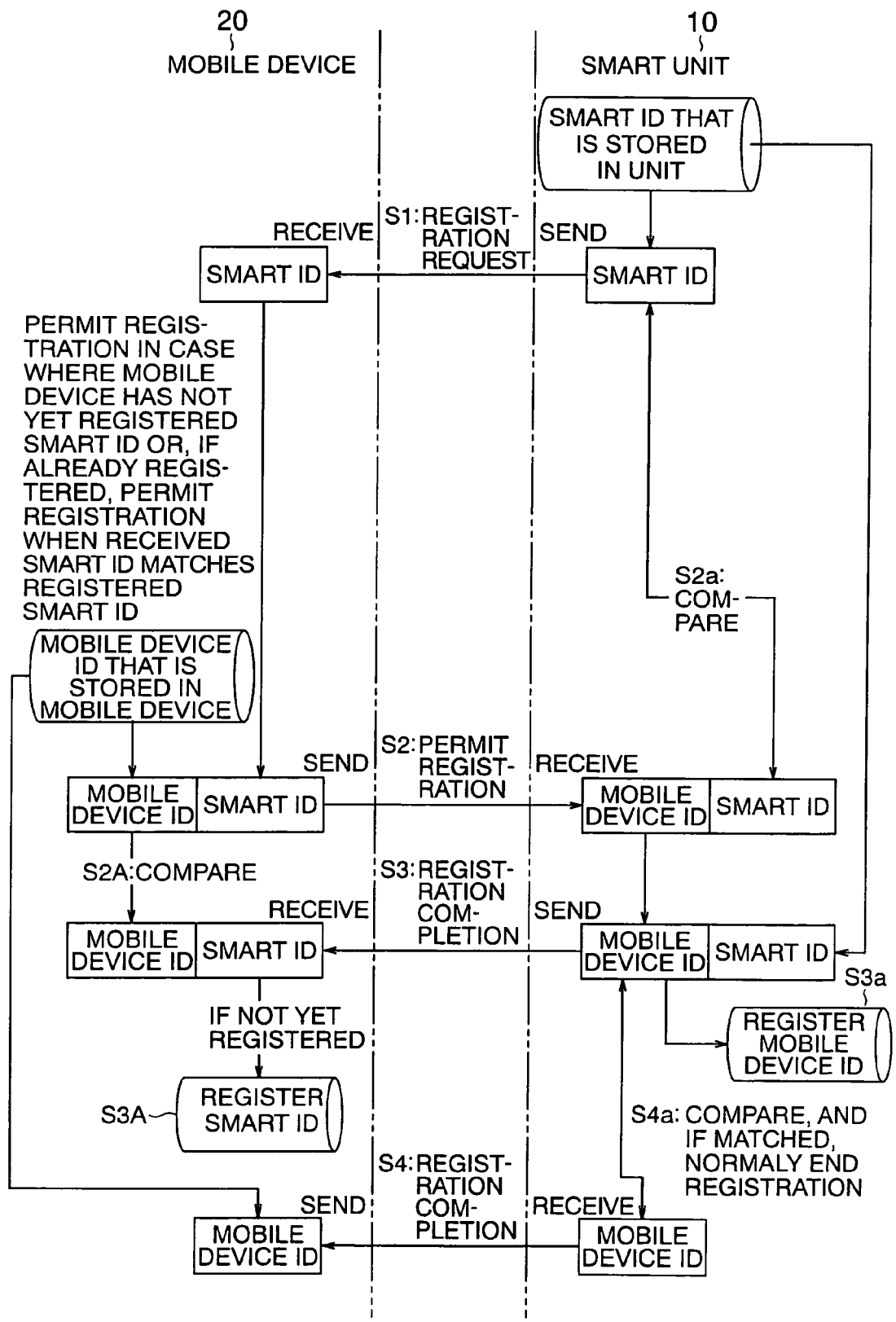
FIG. 4 is a flowchart showing mobile device registration processing according to Embodiment 1 of the present invention.

Next, FIG. 4 and FIG. 5 will be referenced to give explanation in more detail regarding mobile device registration processing, in accordance with Embodiment 1 of the present invention.

FIG. 4 is a flowchart showing mobile device registration processing according to Embodiment 1 of the present invention. Each processing in steps S1 through S4 is illustrated separately with respect to the processing for the smart unit 10 and for the mobile device.

Furthermore, FIG. 5 is an explanatory diagram showing data structures of signals that are sent and received in correspondence with each processing in steps S1 through S4 in FIG. 4. Shown are the registration request signal sent from a smart unit 10 (step S1), the registration permission signal sent from a mobile device 20 (step S2), the registration completion signal sent from the smart unit 10 (step S3), and the registration completion signal sent from the mobile device 20 (step S4).

In FIG. 4, first, the smart unit 10 sends the registration request signal to the mobile device 20 to request registration of the mobile device ID (step S1).

As shown in FIG. 5, the registration request signal sent from the smart unit 10 in step S1 is constructed with a "Wakeup Pattern" between bursts, a control bit, the smart ID that is registered in the smart unit 10 itself, and an end bit.

The mobile device 20 that received the smart ID confirms that the smart ID is not registered in its own memory. If the smart ID has not yet been registered, then the mobile device 20 sends the registration permission signal to the smart unit 10 to permit registration (step S2).

Otherwise, in the case where the smart ID is already registered in the memory of the mobile device 20, the mobile device 20 compares the smart ID received at the time of receiving the registration request against the smart ID that is already registered. The registration permission signal is sent out only in a case where the two match each other (step S2).

As shown in FIG. 5, the registration permission signal sent from the mobile device 20 in step S2 is constructed with a synchronization signal, a start bit, a control bit, the mobile device ID registered in the mobile device 20 itself, the received smart ID, and an end bit.

On the other hand, in the case where the smart ID is already registered in the memory of the mobile device 20 and the received smart ID does not match the registered smart ID, the mobile device 20 does not respond to the registration request signal, and does not send out the registration permission signal.

In the case where the smart unit 10 has not received a response signal from the mobile device 20 during a given period of time after the registration request signal was sent, the smart unit 10 determines that the registration request was rejected.

In the case where the smart unit 10 did receive the registration permission signal from the mobile device 20, first, the smart unit 10 references the mobile device ID and the smart ID that are included in the registration permission signal, and then compares the received smart ID against the smart ID that the smart unit 10 itself sent out at the time when the registration request (step S1) was made (step S2a). Depending on whether the two match each other or not, the smart unit 10 thus confirms whether or not the mobile device 10 that sent the registration permission signal is actually the communication partner of the smart unit 10.

The smart unit 10, after confirming that the sent smart ID and the received smart ID match each other in step S2a, then registers the received mobile device ID into the memory (step S3a), and sends a registration completion signal to the mobile device 20 (step S3).

As shown in FIG. 5, the registration completion signal sent from the smart unit 10 at step S3 is constructed with a "Wakeup Pattern" between bursts, a control bit, the smart ID that is registered in the smart unit 10 itself, the mobile device ID that has been registered this time, and an end bit.

The mobile device 20 receives the registration completion signal containing the mobile device ID and the smart ID, and then compares the received mobile device ID and the mobile device ID (step S2A), which was sent at the time when registration was permitted (step S2). By confirming that the two match each other, the mobile device 20 thus confirms that the communication partner this time is the smart unit 10 where data was sent.

At this time, if the mobile device 20 has not yet registered the smart ID, then the smart ID that has been received this time is registered into the memory of the mobile device 20 (step S3A).

Finally, the mobile device 20 sends the registration completion signal to the smart unit 10 (step S4).

As shown in FIG. 5, the registration completion signal sent from the mobile device 20 in step S2 is constructed with a synchronization signal, a start bit, a control bit, the mobile device ID registered in the mobile device 20 itself, and an end bit.

The smart unit compares the mobile device ID contained in the registration completion signal received at step S4 and the mobile device ID that was sent to the smart unit at the time when registration was completed (step S3) against each other (step S4). If they match each other, then the smart unit determines that the current communication has ended normally.

According to the foregoing registration procedure, it becomes impossible for the mobile device that is already registered in another smart unit to be re-registered anew into another smart unit, thus guaranteeing theft prevention.

Next, the timing chart in FIG. 6 will be referenced to give more specific explanation again regarding the procedure for registering the mobile device, in accordance with Embodiment 1 of the present invention.

As just one example, FIG. 6 illustrates a procedure in a case of registering the three mobile devices 20A, 20B, 20C into one smart unit 10a.

Note that, similarly to the foregoing descriptions, unique smart IDa and mobile device IDs A, B, C have been set in the smart unit 10a and the mobile devices 20A, 20B, 20C in advance.

Furthermore, the smart unit 10a has the memory Ma, which stores the registered mobile device ID.

Similarly, the mobile devices 20A, 20B, 20C each have respective memories MA, MB, MC, which store the registered smart ID of the smart unit 10a.

The memory Ma of the smart unit 10a has, for example, five memory areas #1 through #5. The mobile device IDs can be stored in each of these.

In other words, up to five mobile devices can be registered into the smart unit 10a. However, in this case, the mobile device IDs are registered in three memory areas #1 through #3.

In FIG. 6, when registering the mobile device, first, at time t1 the tool (not shown in the diagram) carried by the dealer is operated.

Accordingly, at time t2 the system switches to a registration mode, and after that, the mobile device 20A which will be registered first becomes able to communicate with the smart unit 10a.

At this time, the power sources of the other mobile devices 20B, 20C are turned off, or their communicating means are shut off or the like to thereby prevent communication interference.

Then, at time t3 a trigger switch SW (not shown in the diagram) which is furnished to the tool is operated, thus causing data communications between the smart unit 10a and the mobile device 20A at times t4 through t5 (steps S1 through S4 in FIG. 4), thus executing the registration of the mobile device 20A.

In this way, when the registration of the mobile device 20A into the smart unit 10a is completed, the mobile device ID A is registered into the memory area #1 in the smart unit 10a, and the smart IDa gets registered into the memory MA of the mobile device 20A.

Similarly, after the power source to the mobile device 20A is turned OFF and the power source to the mobile device 20B is turned ON, at time t9 the trigger switch SW is operated, the registration of the mobile device 20B is made through data communications between the smart unit 10a and the mobile device 20B at times t7 through t8, and at time t8, the mobile device ID B is registered into the memory area #2 of the smart unit 10a, and in addition, the smart IDa is registered into the memory MB of the mobile device 20B.

Similarly, after the power source to the mobile device 20B is turned OFF and the power source to the mobile device 20C is turned ON, at time t9 the trigger switch SW is operated, thereby performing the registration of the mobile device 20C through data communications between the smart unit 10a and the mobile device 20C at times t10 through t11. At time t11, the mobile device ID C is registered into the memory area #3 of the smart unit 10a, and the smart IDa is registered into the memory MC of the mobile device 20C.

In this way, when the registration of the three mobile devices 20A, 20B, 20C into the smart unit 10a is completed, the mobile device IDs A, B, C are registered into the memory areas #1 through #3 in the smart unit 10a, and the smart IDa gets registered into the memories MA, MB, MC of the mobile devices 20A, 20B, 20C.

In such a way, by registering the smart IDa into each of the memories MA, MB, MC of the mobile devices 20A, 20B, 20C that were registered into the smart unit 10a, redundant registration into the other smart unit (for example, 10b) becomes impossible.

As mentioned above, in accordance with Embodiment 1 of the present invention, instead of the conventional mechanical key, the mobile device carried by the user and the smart unit mounted in the vehicle are provided so as to be communicable with each other, and the smart unit compares the mobile device ID of the mobile device that has been obtained through the communication this time with the mobile device ID that is already registered in the smart unit itself, and the unlocking or locking of the vehicle is performed only when it is determined that they match each other (the user is carrying the mobile device that is already registered). At this time, the registration of the mobile device ID can only be performed with respect to one smart unit.

Specifically, when the smart unit registers the new mobile device, the smart unit confirms permission to register and then registers the mobile device ID of the new mobile device in its memory, and also registers the smart unit's own unique smart ID into the mobile device that is to be registered.

At this time, the registration processing is executed only in the case where the smart ID is not yet registered into the mobile device to be registered, or in the case where the smart ID that is already registered in the mobile device matches the smart unit's own smart ID.

In other words, in the case where the mobile device has not yet registered the smart ID in its memory, the smart ID of the smart unit is registered in response to the registration request signal. In the case where the smart ID of the smart unit differs from the registered smart ID, this means that the mobile device is the mobile device which is already registered in another smart unit, and therefore, registration of that mobile device is not permitted.

Furthermore, at the time when the manufacturer ships out the mobile device, a unique smart ID programmed at the time of shipping (a smart ID for a unique smart unit) for that mobile device is registered into the mobile device and the mobile device is shipped out. Then, when the mobile device is to be registered into the smart unit, that mobile device can be registered only when the smart ID that is stored in that mobile device matches the smart unit ID of the smart unit.

Even in this case, if a smart ID of a smart unit that sent the registration request signal is different from the smart ID programmed at the time of shipping, then this means that the mobile device has been registered (or should be registered) in another smart unit. Therefore, the registration of that mobile device is not permitted.

In this way, the smart unit confirms that the mobile device is the registered mobile device which has already been registered in the smart unit that is mounted in another vehicle. Accordingly, even if a third party who thoroughly knows how to register the mobile device into the smart unit were to carry the mobile device which has already been registered into the other smart unit and try to register the mobile device anew into the other smart unit and steal the vehicle in which the other smart unit is mounted, it is impossible to redundantly register the mobile device into the other smart unit, and thus security can be improved.

Note that, in Embodiment 1 above, explanation was given regarding the case where, without using the mechanical key, the mobile device that is carried by the user and the smart unit that is mounted in the vehicle are used to unlock and lock the automobile, motorcycle or other such vehicle, but it goes without saying that the present invention can be used in an immobilizer system or other such theft prevention system.

Furthermore, regarding the locking operation, depending on the vehicle type there are cases where locking can be performed by operating a button on the vehicle side with or without the mobile device. In this case, the above-mentioned theft prevention system is applied only to the unlocking operation.

What is claimed is:

1. A mobile device registration system, comprising:
   a smart unit mounted in a vehicle that has a unique smart ID corresponding to the vehicle and allows registration of a mobile device ID; and
   a mobile device having a unique mobile device ID and allowing registration of the smart ID,
   wherein when the smart unit registers the mobile device ID of one mobile device, the smart unit registers its own smart ID into the one mobile device, and unlocking or locking of the vehicle is performed only when the smart unit detects the mobile device having the mobile device ID that is registered in the smart unit,
   wherein when the smart unit registers the mobile device ID of the one mobile device, in a case where no registered smart ID exists in the one mobile device, the smart unit registers the mobile device ID of the one mobile device, and
   in a case where a registered smart ID exists in the one mobile device, the smart unit registers the mobile device ID of the one mobile device only when the registered smart ID matches its own smart ID.

2. A mobile device registration system according to claim 1, wherein when the smart unit registers the mobile device ID of the one mobile device, the smart unit sends a registration request signal containing its own smart ID to the one mobile device,
   in a case where the smart ID is not yet registered in a memory of the one smart device, or in a case where the smart ID contained in the registration request signal matches the registered smart ID, the one mobile device responds to the registration request signal by sending a registration permission signal containing the mobile device's own mobile device ID to the smart unit, and
   the smart unit registers the mobile device ID contained in the registration permission signal into the smart unit's own memory.

3. A mobile device registration system according to claim 2, wherein the one mobile device prohibits sending of the registration permission signal in a case where the smart ID contained in the registration request signal does not match the registered smart ID, and in a case where the smart unit does not receive the registration permission signal during a predetermined period of time after the smart unit sends the registration request signal, the smart unit determines that the registration request was rejected, and does not register the mobile device ID of the one mobile device.

4. A mobile device registration system, comprising;
a smart unit mounted in a vehicle that has a unique smart ID corresponding to the vehicle and allows registration of a mobile device ID; and
a mobile device having a unique mobile device ID and allowing registration of the smart ID,
wherein when the smart unit registers the mobile device ID of one mobile device, the smart unit registers its own smart ID into the one mobile device, and unlocking or locking of the vehicle is performed only when the smart unit detects the mobile device having the mobile device ID that is registered in the smart unit,
wherein when the smart unit registers the mobile device ID of the one mobile device, the smart unit registers the mobile device ID of the one mobile device only in a case where a smart ID programmed at a shipping time that is registered upon shipment of the one mobile device matches its own smart ID.

5. A mobile device registration system according to claim 4, wherein when the smart unit registers the mobile device ID of the one mobile device, the smart unit sends a registration request signal containing the smart unit's own smart ID to the one mobile device, in a case where the smart ID contained in the registration request signal matches the smart ID programmed at the shipping time, the one mobile device responds to the registration request signal by sending a registration permission signal containing the mobile device's own mobile device ID to the smart unit, and the smart unit registers the mobile device ID contained in the registration permission signal into the smart unit's own memory.

6. A mobile device registration system according to claim 5, wherein the one mobile device prohibits sending of the registration permission signal in a case where the smart ID contained in the registration request signal does not match the smart ID programmed at the shipping time, and in a case where the smart unit does not receive the registration permission signal during a predetermined period of time after the smart unit sends the registration request signal, the smart unit determines that the registration request was rejected, and does not register the mobile device ID of the one mobile device.

* * * * *